United States Patent
Azulai et al.

(10) Patent No.: US 11,157,257 B2
(45) Date of Patent: Oct. 26, 2021

(54) AUTOMATIC CLONING OF CONDA ENVIRONMENT INTO DOCKER IMAGE

(71) Applicant: International Business Machines Corporation, Armonk, NY (US)

(72) Inventors: Ophir Azulai, Tivon (IL); Ofer Lavi, Tel-Aviv (IL); Eran Raichstein, Yokneam Ilit (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/735,767

(22) Filed: Jan. 7, 2020

(65) Prior Publication Data

US 2021/0208862 A1 Jul. 8, 2021

(51) Int. Cl.
*G06F 8/61* (2018.01)
*G06F 9/455* (2018.01)
*G06F 8/51* (2018.01)
*G06F 8/65* (2018.01)

(52) U.S. Cl.
CPC ............ *G06F 8/63* (2013.01); *G06F 8/51* (2013.01); *G06F 8/65* (2013.01); *G06F 9/455* (2013.01)

(58) Field of Classification Search
CPC ... G06F 8/60–66; G06F 9/44584; G06F 9/455
See application file for complete search history.

(56) References Cited

U.S. PATENT DOCUMENTS 9,811,806 B1 * 11/2017 Kuang .................. G06F 16/128
2017/0264684 A1 9/2017 Spillane
2019/0190776 A1 6/2019 Bregman

OTHER PUBLICATIONS

Feng, J, et al., Managing Python Project with Conda, Medium [online], 2017 [retrieved Sep. 8, 2020], Retrieved from: <URL: http://webcache.googleusercontent.com/search?q=cache:o_6K7PkPj4kJ:https://medium.com/little-big-engineering/a-simple-python-workflow-for-devops-85536d514682&hl=en&gl=US&strip=0&vwsrc=0>, pp. 1-3.*
Pipis, G., "Basic Examples of Anaconda Environments", Predictive Hacks [online], 2019 [retrieved Mar. 20, 2021], Retrieved from Internet: <URL: https://predictivehacks.com/working-with-anaconda-environments/>, pp. 1-9.*
Anaconda Inc., "Anaconda Platform Documentation," Release 5.4.0, Online at https://readthedocs.com/projects/continuumio-anaconda-platform/downloads/pdf/latest/, Nov. 8, 2019 (last viewed Nov. 24, 2019).

(Continued)

*Primary Examiner* — Todd Aguilera
(74) *Attorney, Agent, or Firm* — Dvir Gassner

(57) ABSTRACT

Automatic cloning of a PYTHON CONDA environment into a DOCKER image, such that at least one CONDA container that functions the same as the PYTHON CONDA environment can be started from the DOCKER image. The automatic cloning may include: First, creating a Dockerfile that comprises commands to: install a PYTHON ANACONDA environment or obtain a PYTHON ANACONDA environment image, copy the PYTHON CONDA environment into the DOCKER image, and run a CONDA command, in the ANACONDA environment, to create a cloned PYTHON CONDA environment from the copied PYTHON CONDA environment. Second, building the DOCKER image from the Dockerfile.

7 Claims, 2 Drawing Sheets

(56) References Cited

OTHER PUBLICATIONS

C. Lagore, "Conda Environments with Docker," Online at https://medium.com/@chadlagore/conda-environments-with-docker-82cdc9d25754, Mar. 9, 2018 (last viewed Nov. 24, 2019).

D. Arpin et al., "Building your own algorithm container," Online at https://github.com/awslabs/amazon-sagemaker-examples/blob/master/advanced_functionality/scikit_bring_your_own/scikit_bring_your_own.ipynb, Nov. 26, 2017 (last viewed Nov. 24, 2019).

R. P. Spillane et al., "Exo-clones: Better Container Runtime Image Management across the Clouds," in Proceedings of the 8th USENIX Workshop on Hot Topics in Storage and File Systems (HotStorage), 2016.

* cited by examiner

AUTOMATIC CLONING OF CONDA ENVIRONMENT INTO DOCKER IMAGE

BACKGROUND

The invention relates to the field of software development.

SaaS (Software as a Service) developers often use development environments that are different from the production (deployment) environments, and this might cause difficulties when a developed (or updated) application has to be transferred to production.

For example, in the DLaaS (Deep Learning as a Service) field, software developers commonly use the CONDA package and environment management system (Anaconda, Inc., of Austin, Tex.) while developing their deep learning applications in various programming languages—prominently PYTHON and R. CONDA quickly installs, runs and updates packages and their dependencies on a development server (or, less commonly, on the developer's workstation). Deep learning developers may use CONDA to install, among others, packages such as the TENSORFLOW library (an open source library maintained by Google LLC, Mountain View, Calif.) or the PYTORCH library (an open source library originally by A. Paszke, S. Gross, S. Chintala, and G. Chanan). The developed applications are then deployed to a cloud computing service which uses the DOCKER container platform (Docker, Inc., San Francisco, Calif.), to make them available to end-users over a network (such as the Internet). A DOCKER container is a self-contained package of all files required to run a certain application on a host computer; such running is facilitated by a DOCKER daemon which runs in the host computer's operating system and, in turn, runs the containers. Deployment of applications using DOCKER is supported by many cloud computing providers, such as IBM Corporation, Google LLC, and Amazon Web Services, Inc. (Seattle, Wash.).

Such deployment typically requires a tedious re-installation process of packages and their dependencies (often using the "pip" package installer for PYTHON or the CONDA "install" command), in order for the application to function as a DOCKER container. Such re-installation consumes computing power, time, and network bandwidth, especially when it must be repeated every time an update to the application is to be deployed from the development environment to the production environment.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment relates to a computerized method comprising: automatically cloning a PYTHON CONDA environment into a DOCKER image, such that at least one CONDA container that functions the same as the PYTHON CONDA environment can be started from the DOCKER image.

Another embodiment relates to a system comprising: (a) at least one hardware processor; and (b) a non-transitory computer-readable storage medium having program code embodied therewith, the program code executable by said at least one hardware processor to: automatically clone a PYTHON CONDA environment into a DOCKER image, such that at least one CONDA container that functions the same as the PYTHON CONDA environment can be started from the DOCKER image.

A further embodiment relates to a computer program product comprising a non-transitory computer-readable storage medium having program code embodied therewith, the program code executable by at least one hardware processor to: automatically clone a PYTHON CONDA environment into a DOCKER image, such that at least one CONDA container that functions the same as the PYTHON CONDA environment can be started from the DOCKER image.

In some embodiments, the cloning comprises: (a) creating a Dockerfile that comprises commands to: (i) install a PYTHON ANACONDA environment or obtain a PYTHON ANACONDA environment image, (ii) copy the PYTHON CONDA environment into the DOCKER image, and (iii) run a CONDA command, in the ANACONDA environment, to create a cloned PYTHON CONDA environment from the copied PYTHON CONDA environment; and (b) building the DOCKER image from the Dockerfile.

In some embodiments, the method further comprises starting the at least one CONDA container from the DOCKER image.

In some embodiments, the program code is further executable to start the at least one CONDA container from the DOCKER image.

In some embodiments, the system further comprises a server having network connectivity and a DOCKER daemon installed thereon, wherein said DOCKER daemon is configured to start the at least one CONDA container from the DOCKER image, thereby the functionality of the at least one CONDA container is made available to multiple clients over the network.

In some embodiments, the method is performed by at least one hardware processor of a computer In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Automatic cloning of a PYTHON CONDA environment into a DOCKER image is disclosed herein. The automatic cloning may be implemented as a software tool that is used when a software application, or an update thereof, is to be advanced from development to production.

Advantageously, the automated cloning may ensure that the resulting DOCKER image is fully operational when used to start at least one CONDA container, without requiring any manual intervention (such as manual package installation) with the DOCKER image creation. In other words, the at least one DOCKER container provides the same functionality as the PYTHON CONDA environment.

Figure 1:
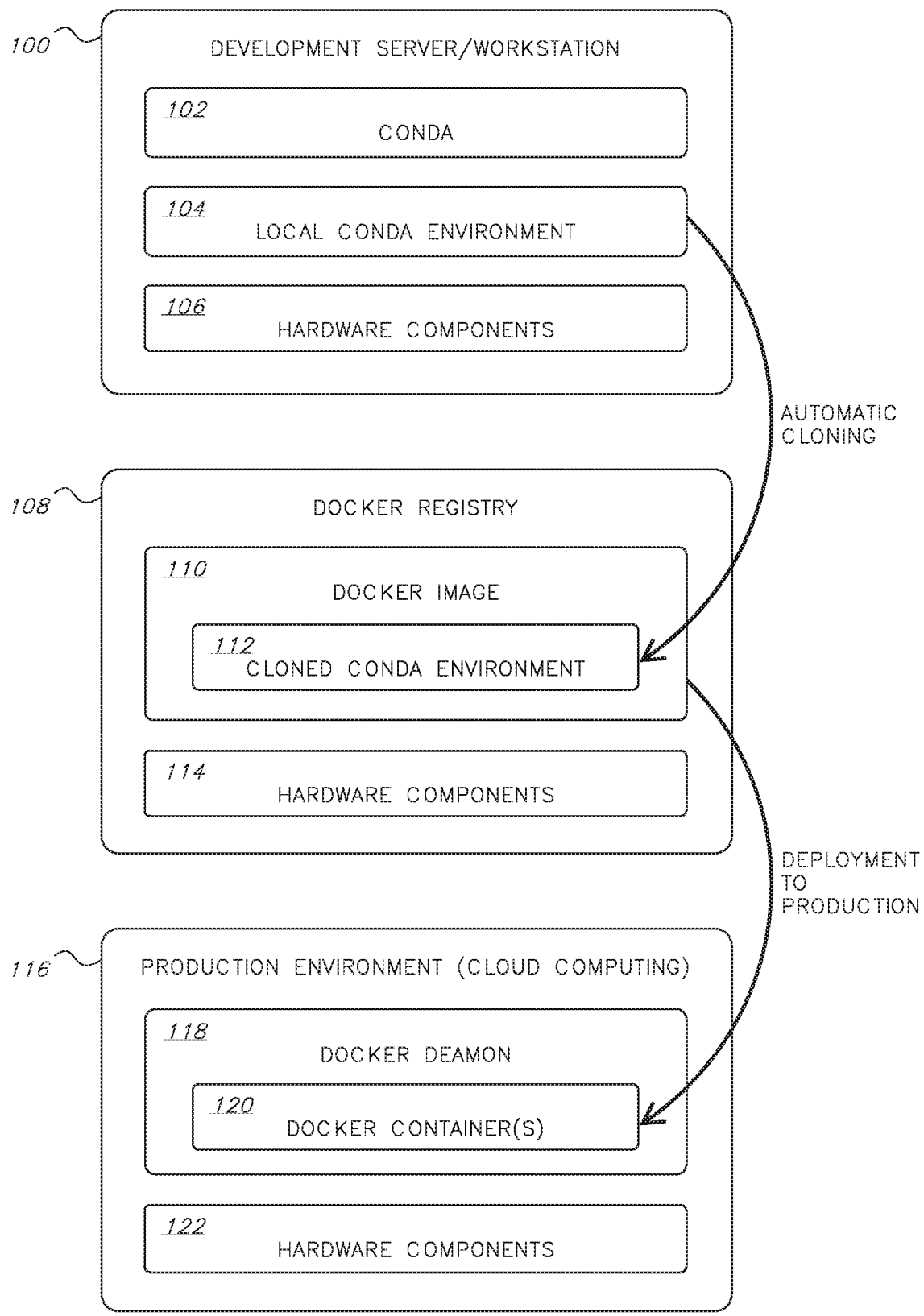
FIG. 1 is a block diagram of an exemplary system architecture for automatic cloning of a PYTHON CONDA environment into a DOCKER image, and for deployment of the DOCKER image, according to an embodiment.

Reference is now made to FIG. 1, which shows a block diagram of an exemplary system architecture for automatic cloning of a PYTHON CONDA environment into a DOCKER image, and for deployment of the DOCKER image, according to an embodiment.

Generally, the system architecture may include a development server or workstation 100 that is used by one or more software developers to develop a software application (e.g., a deep learning software application) as a "local" CONDA environment 104. That local CONDA environment 104 may then be automatically cloned into a DOCKER image 110 and pushed to a DOCKER registry 108. A production environment 116, such as a cloud computing service which includes one or multiple physical servers, may pull DOCKER image 110 from DOCKER registry 108, and start a DOCKER container 120 from it. The functionality of DOCKER container 120, which is the same as that of local CONDA environment 104, may then be made available to multiple clients (i.e., end users) over a network such as the Internet.

Each of development server/workstation 100, DOCKER registry 108, and production environment 116, may have its own set of hardware components 106, 114, and 122, respectively, that enable it to function as an operable computer system. Such hardware components may include, for example, one or more hardware processor(s) such as CPUs (Central Processing Units) and/or GPUs (Graphic Processing Units), one or more RAM (Random Access Memory) modules, one or more NICs (Network Interface Cards), one or more motherboards, one or more non-transitory computer-readable storage devices (such as magnetic hard drives, solid-state hard drives), etc., as known in the art.

The storage device(s) of development server/workstation 100, for example, may have stored thereon program instructions that constitute a software tool that performs the automatic cloning of present embodiments. Alternatively, the software tool may be stored and/or executed on another computer accessible by the software developer(s). Whatever computer the software tool is executed on, that computer may load program instructions of the software tool into its RAM as they are being executed by its hardware processor(s).

The system architecture described herein is only an exemplary embodiment of the present invention, and in practice may have more or fewer components than shown, may combine two or more of the components, or may have a different configuration or arrangement of the components.

Figure 2:
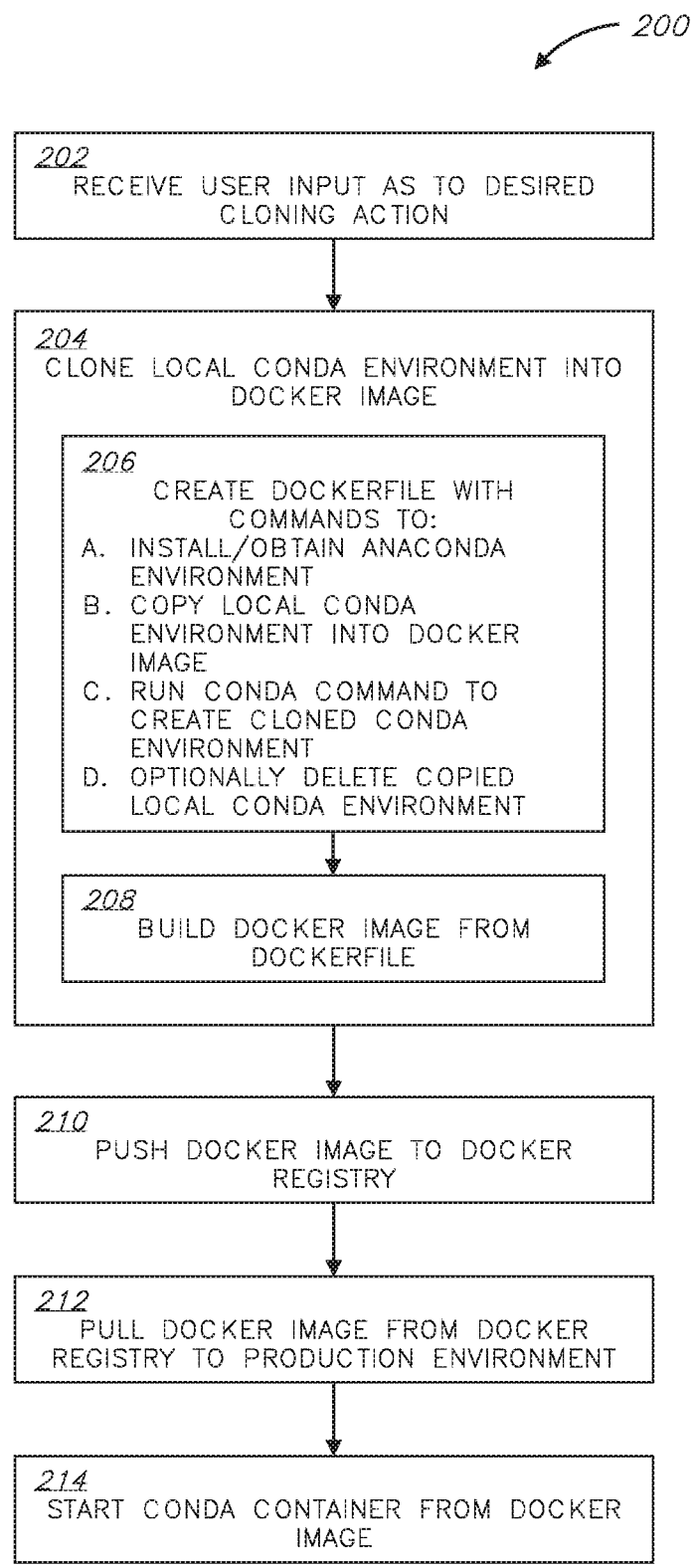
FIG. 2 is a flowchart of a method for automatic cloning of a PYTHON CONDA environment into a DOCKER image, and for deployment of the DOCKER image, according to an embodiment.

The operation of the system architecture illustrated in FIG. 1, and of the above-mentioned software tool, is now described in greater detail with reference to the flowchart of FIG. 2. That figure illustrates a method 200 for automatic cloning of a PYTHON CONDA environment into a DOCKER image, and for deployment of the DOCKER image.

Steps of method 200 may either be performed in the order they are presented or in a different order (or even in parallel), as long as the order allows for a necessary input to a certain step to be obtained from an output of an earlier step. In addition, the steps of method 200 are performed automatically (e.g., by one or more components of the system architecture of FIG. 1), unless specifically stated otherwise.

Method 200 may be based on the operation of three main components —development server/workstation 100, DOCKER registry 108, and production environment 116. At the onset, development server/workstation 100 includes a CONDA package and environment management system (hereinafter "CONDA") 102 installed thereon, and stores local CONDA environment 104 which constitutes a PYTHON-based software application having a certain functionality, such as a deep learning functionality. The deep learning functionality may include, for example, extraction of features from input, classification of input, etc., for a variety of tasks—such as image recognition or analysis, speech recognition, drug discovery, and more. Being written primarily in the PYTHON programming language, local CONDA environment 104 may also be referred to as a "PYTHON" CONDA environment. Further at the onset, development server/workstation 100 or any other computer accessible by the developer(s) may have the DOCKER software product installed thereon; this will be used for creating the DOCKER image.

In a step 202 of method 200, input from a user (e.g., the developer) as to the desired cloning action may be received. The user may specify, as input, the name and/or storage location of the particular local CONDA environment 104 he or she wishes to clone into a DOCKER image. The input may be received using a CLI (Command-Line Interface) or a GUI (Graphical User Interface), for example.

In a step 204, local CONDA environment 104, whose name and/or storage location were received in step 202, is cloned into a DOCKER image 110, such that at least one CONDA container 120 that is later started from that DOCKER image is fully operational, and functions the same as the local CONDA environment.

The automatic cloning of step 204 may include the following sub-steps:

In sub-step 206, a Dockerfile may be created, with certain commands included therein. A Dockerfile is a batch file that contains successive commands that are called on a DOCKER command line to assemble a DOCKER image, such as DOCKER image 110. The Dockerfile may be created to include the following commands:

First, a command to install a PYTHON ANACONDA environment or to obtain a PYTHON ANACONDA environment image. Installation of a PYTHON ANACONDA environment from within the Dockerfile may include the following exemplary commands or equivalents thereof:

1: ARG PYTHON_VERSION=3
2: RUN wget <installation file URL> -O~/anaconda.sh && \bash ~/anaconda.sh -b -p/opt/conda && †rm ~/anaconda.sh
3: ENV PATH="/opt/conda/bin:$PATH"

Command no. 1 sets the PYTHON version, 3 in this example. Command no. 2 fetches an ANACONDA installation file from an Internet repository defined by <installation file>. Command no. 3 specifies the path where the PYTHON ANACONDA environment should be installed, for example "/opt/conda/bin".

Obtaining a PYTHON ANACONDA environment image (namely, an image of a pre-installed PYTHON ANACONDA environment) may be performed by the following exemplary command or equivalents thereof:

1: FROM <image file URL>AS<name>

Command no. 1 fetches an ANACONDA image file from an Internet repository defined by <image file URL>, and renames it to the name specified in <name>.

The next command in the Dockerfile may be to copy local CONDA environment 104 into DOCKER image 110. For example:
1: COPY ./$CONDA_ENV/tmp/localenv/
This COPY command will replicate all files existing in the local directory ($CONDA_ENV) on development server/workstation 100, which directory constitutes local CONDA environment 104. These files include all PYTHON packages previously installed on development server/workstation 100 by the developer(s), and all modification to these packages made by the developer(s). The replicated files will be stored in a temporary directory of the DOCKER image, such as "/tmp/localenv". However, this replication is not sufficient to achieve the desired cloning, because a directory of files is still not an acceptable and readable CONDA environment; hence the following:

Next in the Dockerfile is a command to clone the copied environment into a new PYTHON CONDA environment. For example:
1: RUN conda create --clone/tmp/localenv -p/opt/conda/envs/py36 --copy
This command utilizes the PYTHON ANACONDA environment installed or obtained by previous commands in the Dockerfile. It instructs the PYTHON ANACONDA environment to create a new PYTHON CONDA environment at "/opt/conda/envs/py36", that is an exact clone of what is expressed by the files at the temporary directory "/tmp/localenv". This "create" command, with its "clone" tag, performs various actions to encapsulate the files into an acceptable, readable CONDA environment.

Optionally, also included in the Dockerfile is a command to delete the copied environment, namely—everything in the temporary directory "/tmp/localenv", whose contents are no longer needed and merely consume space.

In sub-step 208 of the cloning, a DOCKER image (namely, DOCKER image 110) may be built from the Dockerfile. This may be performed by the following command, or an equivalent thereof, which utilizes the installed DOCKER software product:
1: docker build -t<image name>
The command, when run from within the directory containing the Dockerfile, will build DOCKER image 110 with the name <image name>. DOCKER image 110 includes therein a cloned CONDA environment 112 which is the result of running the aforesaid Dockerfile command to clone the copied environment into a new PYTHON CONDA environment.

The actions of steps 202-208 may constitute the aforementioned software tool for automatic cloning of a PYTHON CONDA environment into a DOCKER image. They may be performed by development server/workstation 100 and/or by any other computer accessible to the developer(s).

In FIG. 1, DOCKER image 110 is shown inside DOCKER registry 108. DOCKER registry 108 is a storage and distribution system for DOCKER images, usually running on a server or in a cloud computing service. DOCKER registry 108 may be private, namely—accessible only to the developer(s) or to persons from the same organization as the developer(s), or public, namely—accessible to any person over the Internet (e.g., the public DOCKERHub registry). In a step 210 of method 200, the developer(s), after using the software tool to automatically clone local CONDA environment 104 into DOCKER image 110, may push the DOCKER image from their development server/workstation 100 (or another computer they have used to perform the cloning) to DOCKER registry 108, using a suitable DOCKER command. Use of DOCKER registry 108, however, is optional. The developer(s) may just as well transmit DOCKER image 100 to production environment 116 via other means.

In production environment 116, a step 212 of method 200 may include pulling DOCKER image 100 from DOCKER registry 108 to production environment 116, using a suitable DOCKER command issued to a DOCKER daemon 118 installed on a network-connected server in the production environment. This may be performed via a manual command issued at production environment 116 by the developer(s), or automatically by the production environment (e.g., periodically, according to a predefined schedule).

Next, a step 214 of method 200 may include starting at least one CONDA container 120 from DOCKER image 110. This may be performed by DOCKER daemon 118, on a network-connected server in production environment 116, for example using the following command or an equivalent thereof:
1: DOCKER container run --publish 8000:8080 --detach --name <container name><image name>
This command starts a CONDA container named <container name> based on a DOCKER image named <image name>, makes the container available over the network ("--publish 8000:8080" forwards traffic incoming on the server's port 8000 to the container's port 8080, as an example), runs it in the background (by "--detach", which is optional), and specifies the name <container name> for it.

At the end of step 210, least one CONDA container 120 is running in the background by DOCKER daemon 118, and its functionality is available to multiple clients (e.g., computers of end-users) over the network.

Those of skill in the art, such as the DLaaS field, will recognize CONDA and DOCKER to be the well-known software products provided by ANACONDA, Inc. and DOCKER, Inc., respectively; those skilled artisans will be familiar with the full functionality set of these products, such as based on the product literature available online at conda.io (last viewed Oct. 15, 2019) and docs.docker.com (last viewed Oct. 15, 2019), respectively, or on other sources of information.

The present invention may be a system, a method, and/or a computer program product. The computer program product may include a computer readable storage medium (or media) having computer readable program instructions thereon for causing one or more hardware processors to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A computerized method comprising:
    creating a Dockerfile that comprises commands to:
        install a PYTHON ANACONDA environment or obtain an image of a pre-installed PYTHON ANACONDA environment,
        copy a PYTHON CONDA environment into a DOCKER image, and
        run a CONDA command, in the installed or pre-installed PYTHON ANACONDA environment, to create a cloned PYTHON CONDA A environment from the copied PYTHON CONDA environment;
    building the DOCKER image from the Dockerfile; and
    starting at least one CONDA container from the DOCKER image, wherein the at least one CONDA container is configured to function the same as the PYTHON CONDA environment, due to said creating and building, wherein:

said install comprises the following commands or equivalents thereof:

'RUN wget <installation file URL> -O ~/anaconda.sh && \bash ~/anaconda.sh -b -p/opt/conda && \rm ~/anaconda.sh', and 'ENV PATH="<path>:$PATH"', wherein <installation file URL> is a Uniform Resource Locator (URL) of an installation file, and <path> is a path where the PYTHON ANACONDA environment is to be installed;

said obtain comprises the following command or an equivalent thereof:

'FROM <image file URL>AS<name>', wherein <image file URL> is a URL of the image, and <name> renames the image;

said copy comprises the following command or an equivalent thereof:

'COPY ./$CONDA_ENV <temporary directory>', wherein $CONDA_ENV is a directory where the PYTHON CONDA environment is stored, and <temporary directory> is a temporary directory in the DOCKER image into which all files of the PYTHON CONDA environment are to be replicated;

said run comprises the following command or an equivalent thereof:

'RUN conda create --clone <temporary directory> -p<new directory> --copy', wherein <temporary directory> is the temporary directory in the DOCKER image into which all files of the PYTHON CONDA environment have been replicated, and <new directory> is a new directory where the cloned PYTHON CONDA environment is to be created;

said build comprises the following command or an equivalent thereof:

'docker build -t <image name>', wherein <image name> is a name of the DOCKER image; and said start comprises the following command or an equivalent thereof:

'docker container run --publish <incoming port>:<container port> --detach --name <container name><image name>', wherein <incoming port> is an incoming traffic port number of a server at which the CONDA container is started, <container port> is a port number of the CONDA container to which the incoming traffic is to be forwarded, <container name> is a name to be given to the CONDA container, and <image name> is the name of the DOCKER image.

2. The computerized method according to claim 1, wherein said starting of the at least one CONDA container is by a DOCKER daemon installed on a server having network connectivity, so that the functionality of the at least one CONDA container is made available to multiple clients over the network.

3. The computerized method according to claim 1, wherein said creating, building, and starting are performed by at least one hardware processor of at least one computer.

4. A system comprising:

(a) at least one hardware processor; and (b) a non-transitory computer-readable storage medium having program code embodied therewith, the program code executable by said at least one hardware processor to:

create a Dockerfile that comprises commands to:

install a PYTHON ANACONDA environment or obtain an image of a pre-installed PYTHON ANACONDA environment, copy a PYTHON CONDA environment into a DOCKER image, and run a CONDA command, in the installed or pre-installed PYTHON ANACONDA environment, to create a cloned PYTHON CONDA environment from the copied PYTHON CONDA environment;

build the DOCKER image from the Dockerfile; and start at least one CONDA container from the DOCKER image, wherein the at least one CONDA container is configured to function the same as the PYTHON CONDA environment, due to said create and build, wherein:

said install comprises the following commands or equivalents thereof:

'RUN wget <installation file URL> -O ~/anaconda.sh && \bash ~/anaconda.sh -b -p/opt/conda && \rm ~/anaconda.sh', and 'ENV PATH="<path>:$PATH"', wherein <installation file URL> is a Uniform Resource Locator (URL) of an installation file, and <path> is a path where the PYTHON ANACONDA environment is to be installed;

said obtain comprises the following command or an equivalent thereof:

'FROM <image file URL>AS<name>', wherein <image file URL> is a URL of the image, and <name> renames the image;

said copy comprises the following command or an equivalent thereof:

'COPY ./$CONDA_ENV <temporary directory>', wherein $CONDA_ENV is a directory where the PYTHON CONDA environment is stored, and <temporary directory> is a temporary directory in the DOCKER image into which all files of the PYTHON CONDA environment are to be replicated;

said run comprises the following command or an equivalent thereof:

'RUN conda create --clone <temporary directory> -p<new directory> --copy', wherein <temporary directory> is the temporary directory in the DOCKER image into which all files of the PYTHON CONDA environment have been replicated, and <new directory> is a new directory where the cloned PYTHON CONDA environment is to be created;

said build comprises the following command or an equivalent thereof:

'docker build -t<image name>', wherein <image name> is a name of the DOCKER image; and said start comprises the following command or an equivalent thereof:

'docker container run --publish <incoming port>:<container port> --detach --name <container name><image name>', wherein <incoming port> is an incoming traffic port number of a server at which the CONDA container is started, <container port> is a port number of the CONDA container to which the incoming traffic is to be forwarded, <container name> is a name to be given to the CONDA container, and <image name> is the name of the DOCKER image.

5. The system according to claim 4, further comprising:
a server having network connectivity and a DOCKER daemon installed thereon,
wherein said DOCKER daemon is configured to perform said starting of the at least one CONDA container from the DOCKER image, thereby the functionality of the at least one CONDA container is made available to multiple clients over the network.

6. A computer program product comprising a non-transitory computer-readable storage medium having program code embodied therewith, the program code executable by at least one hardware processor to:
create a Dockerfile that comprises commands to:
install a PYTHON ANACONDA environment or obtain an image of a pre-installed PYTHON ANACONDA environment,
copy a PYTHON CONDA environment into a DOCKER image, and
run a CONDA command, in the installed or pre-installed PYTHON ANACONDA environment, to create a cloned PYTHON CONDA environment from the copied PYTHON CONDA environment;
build the DOCKER image from the Dockerfile; and
start at least one CONDA container from the DOCKER image, wherein the at least one CONDA container is configured to function the same as the PYTHON CONDA environment, due to said create and build,
wherein:
said install comprises the following commands or equivalents thereof:
'RUN wget <installation file URL> -O ~/anaconda.sh && \bash ~/anaconda.sh -b -p/opt/conda && \rm ~/anaconda.sh', and
'ENV PATH="<path>:$PATH"',
wherein <installation file URL> is a Uniform Resource Locator (URL) of an installation file, and <path> is a path where the PYTHON ANACONDA environment is to be installed;

said obtain comprises the following command or an equivalent thereof:
'FROM <image file URL>AS<name>',
wherein <image file URL> is a URL of the image, and <name> renames the image;
said copy comprises the following command or an equivalent thereof:
'COPY ./$CONDA_ENV <temporary directory>',
wherein $CONDA_ENV is a directory where the PYTHON CONDA environment is stored, and <temporary directory> is a temporary directory in the DOCKER image into which all files of the PYTHON CONDA environment are to be replicated;
said run comprises the following command or an equivalent thereof:
'RUN conda create --clone <temporary directory> -p<new directory> --copy',
wherein <temporary directory> is the temporary directory in the DOCKER image into which all files of the PYTHON CONDA environment have been replicated, and <new directory> is a new directory where the cloned PYTHON CONDA environment is to be created;
said build comprises the following command or an equivalent thereof:
'docker build -t<image name>',
wherein <image name> is a name of the DOCKER image; and
said start comprises the following command or an equivalent thereof:
'docker container run --publish <incoming port>:<container port> --detach --name <container name><image name>',
wherein <incoming port> is an incoming traffic port number of a server at which the CONDA container is started, <container port> is a port number of the CONDA container to which the incoming traffic is to be forwarded, <container name> is a name to be given to the CONDA container, and <image name> is the name of the DOCKER image.

7. The computer program product according to claim 6, wherein said starting of the at least one CONDA container is by a DOCKER daemon installed on a server having network connectivity, so that the functionality of the at least one CONDA container is made available to multiple clients over the network.

* * * * *